United States Patent [19]

Yamashita

[11] Patent Number: 4,712,171

[45] Date of Patent: Dec. 8, 1987

[54] ELECTRICAL POWER SOURCE

[75] Inventor: Toshihiko Yamashita, Osaka, Japan

[73] Assignee: Uniqey (Hong Kong) Limited, Hong Kong

[21] Appl. No.: 939,516

[22] PCT Filed: Mar. 14, 1986

[86] PCT No.: PCT/GB86/00152
§ 371 Date: Jan. 15, 1987
§ 102(e) Date: Jan. 15, 1987

[87] PCT Pub. No.: WO86/05636
PCT Pub. Date: Sep. 25, 1986

[30] Foreign Application Priority Data

Mar. 15, 1985 [GB] United Kingdom ................ 8506739

[51] Int. Cl.$^4$ ............................................. H02M 1/10
[52] U.S. Cl. .................................... 363/142; 323/303; 363/89
[58] Field of Search .......................... 363/142, 143, 89; 323/299, 303; 307/17, 38, 39

[56] References Cited

U.S. PATENT DOCUMENTS 3,414,802 12/1968 Harrigan .
4,052,660 10/1977 Shuey .
4,415,964 11/1983 Scharfe .

FOREIGN PATENT DOCUMENTS 2210859 12/1974 France .

Primary Examiner—Peter S. Wong
Assistant Examiner—Judson H. Jones
Attorney, Agent, or Firm—Townsend and Townsend

[57] ABSTRACT

A power source capable of providing a constant DC output when supplied with one of a range of AC inputs. Converter means providing a number of outputs of differing voltages each proportional to the input voltage. A number of parallel circuit lines each connected to one of those outputs. Each parallel circuit line including a rectifier, a maximum voltage regulator and a non-return current device. The outputs from those lines being connected to a common output to give the constant DC voltage supply. Each voltage regulator has a set regulating voltage which is one of a discrete range of voltage steps close to the required substantially constant DC voltage, the lowest of the steps being no greater than the voltage reached for the line connected to the highest output from the converter means when the input supply is at the low end of the range of AC voltages, the next of the steps being greater than the lowest and being reached for the line connected to the next highest output from the converter means, and, if there are more than two parallel circuit lines, the next step being greater and being reached for the line connected to the next highest output from the converter means and so on, so as to cover the range of possible input AC voltages.

5 Claims, 5 Drawing Figures

ELECTRICAL POWER SOURCE

This invention relates to electrical power sources.

Many pieces of domestic electrical equipment need to be capable of working with different mains supply voltages, the most common which are the 110 volts supply existing, for example, in the United States of America and the 220 volts supply existing, for example, in Europe. In some countries the standard voltage is slightly different from these standard voltages whilst in other countries the supply itself may have a rather erratic and variable value.

To meet the differences between a 110 volts and a 220 volts supply, equipment such as electric shavers may use a simple resistor which can be manually switched into and out of circuit to dissipate the excess of the larger voltage. Alternatively a transformer can be used where a large power supply is concerned but it is still necessary to adjust the tap position manually to match the supply and in many cases adjustment for the relatively small changes from the two standard voltages is not provided for. Also no account is taken of erratic changes in voltage.

It is therefore an object of this invention to provide a simple power source which can accept a wide range of AC power input voltages yet which will automatically provide a relatively constant DC output.

According to the invention there is provided an electrical power source capable of accepting an input within a range of AC input voltages and providing a substantially constant DC output supply, comprising converter means for providing from the AC input supply a number of outputs of differing voltages each proportional to the input voltage, each of these outputs being connected respectively to one of a number of parallel circuit lines each of which includs a rectifier, a maximum voltage regulator and non-return current device, the outputs of these lines being connected to a common output intended to provide the substantially constant DC voltage supply, each voltage regulator having a set regulating voltage which is one of a discrete range of voltage steps close to the required substantially constant DC voltage, the lowest of the steps being no greater than the voltage reached for the line connected to the highest output from the converter means when the input supply is at the low end of the range of AC voltages, the next of the steps being greater than the lowest and being reached for the line connected to the next highest output from the converter means, and, if there are more than two parallel circuit lines, the next step being greater and being reached for the line connected to the next highest output from the converter means and so on, so as to cover the range of possible input AC voltages.

Such a power supply can be very simple to make and in addition can occupy a relatively small space. It can, therefore, fit easily within many domestic electrical appliances. Also the supply automatically accepts any AC voltage within the designed range of AC input voltage and gives a substantially constant DC output. Further the power source accepts automatically any erratic and fluctuating changes in the input voltage substantially within affecting the output DC voltage.

Typically there will be four parallel circuit lines to cover an input AC voltage range from 80 to 260 volts.

In order to improve the stability of the output DC voltage the common output can be fed through another maximum voltage regulator having a set output voltage which is lower than any of the set values of those in the parallel circuit lines. In this way even though there will be small voltage changes as a result of current being drawn from one or other of the parallel circuit lines depending on the input voltage, the final output voltage can be very stable. In some cases, however, this further step may not be necessary because the relatively small differences in output from the various parallel circuit lines may insignificant to the piece of equipment receiving the DC output.

An important advantage of the invention is that the power source has low high-frequency noise and so a low risk of radio interference.

A power source according to the invention will now be described, by way of example, with reference to the accompanying drawings, in which.

Figure 1:
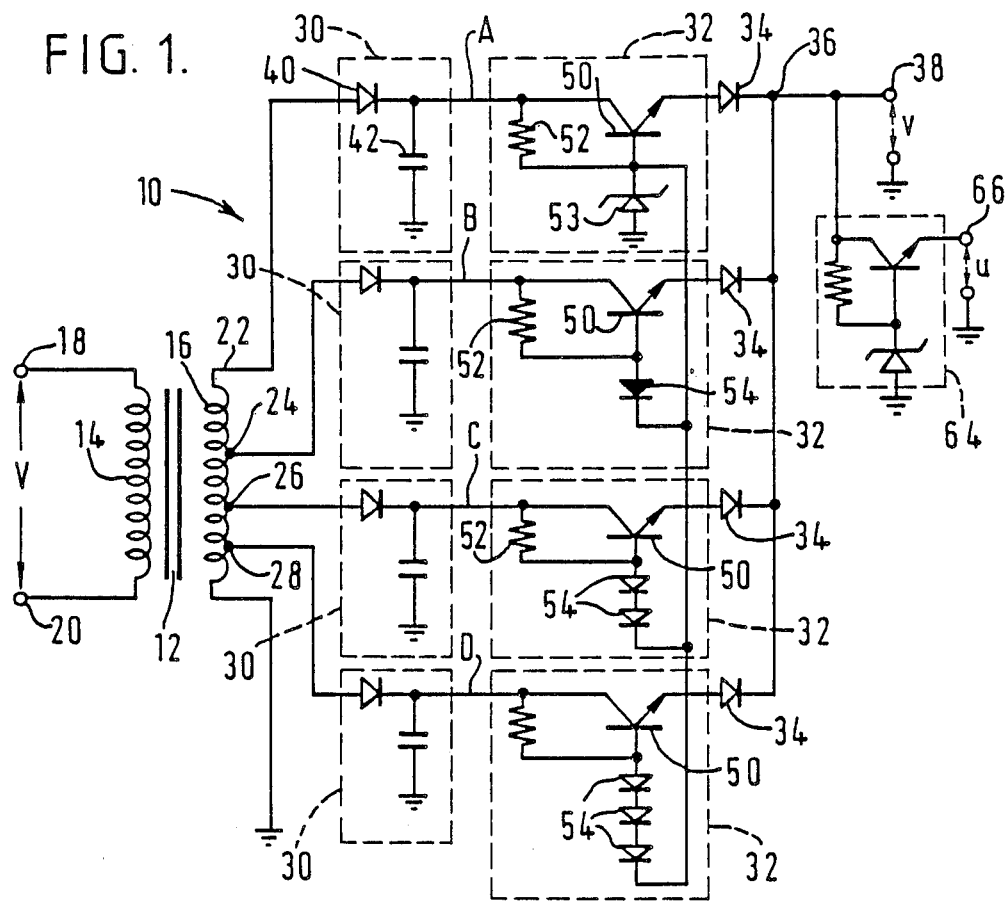
FIG. 1 is a circuit diagram of one form of power source according to the invention.

The power source 10 shown in FIG. 1 includes a transformer 12 which has a primary 14 and secondary 16. The primary 14 receives an input AC voltage V across the terminals 18 and 20. The secondary 16 has a number of tappings providing outputs at points 22, 24, 26 and 28.

Each of the points 22 to 28 is connected to one of the parallel lines A, B, C & D. Each line includes a rectifier 30, a voltage regulator 32 and a diode 34 to prevent return current flow. The lines A to D all join at a common point 36 which provides a substantially constant DV voltage output v at the output 38.

Figure 1A:
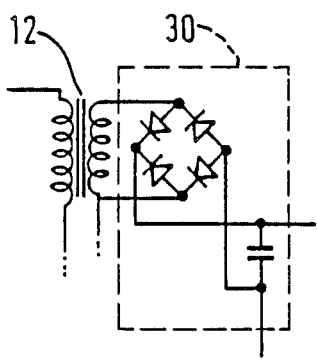
FIG. 1A is a detail showing a modified embodiment.

The rectifiers 30 can be a half-wave rectifier composed of a diode 40 and capacitor 42 as shown in FIG. 1 or can be a full-wave rectifier as shown in FIG. 1A.

Equally the transformer 14 could be replaced by a resistor with tappings to provide voltages corresponding to those at the points 22 to 28.

Each voltage regulator 32 comprises a transistor 50 whose base is held at a particular voltage by a resistor 52 and a common Zenner diode 53, and if appropriate one or more diodes 54. In this way depending upon the voltage supplied to its base, each transistor 50 will give an output DC voltage at its emitter which reaches a maximum predeterminal level when the voltage on its collector reaches a certain value and will not exceed this even when the voltage applied to the collector exceeds that said certain value.

It will be seen that the voltage which is applied to the base of the respective transistors 50 varies from one of the lines A to D to another. Indeed the arrangement is such that the voltage at the base in line A is lower than that at the base in line B, the voltage at the base in line B is lower than that at the base in line C and that the voltage at the base in line C is lower than that at the base in line D.

The AC voltage V which is supplied to the primary 14 of the transformer 12 is within a predetermined ranges and as an example it is convenient to design the power supply so that it will accept AC voltages within the range of 80 to 260 volts. This will then embrace the full range of commonly existing mains supply voltages and in particular the American 110 voltage and European 220 voltage.

Figure 2:
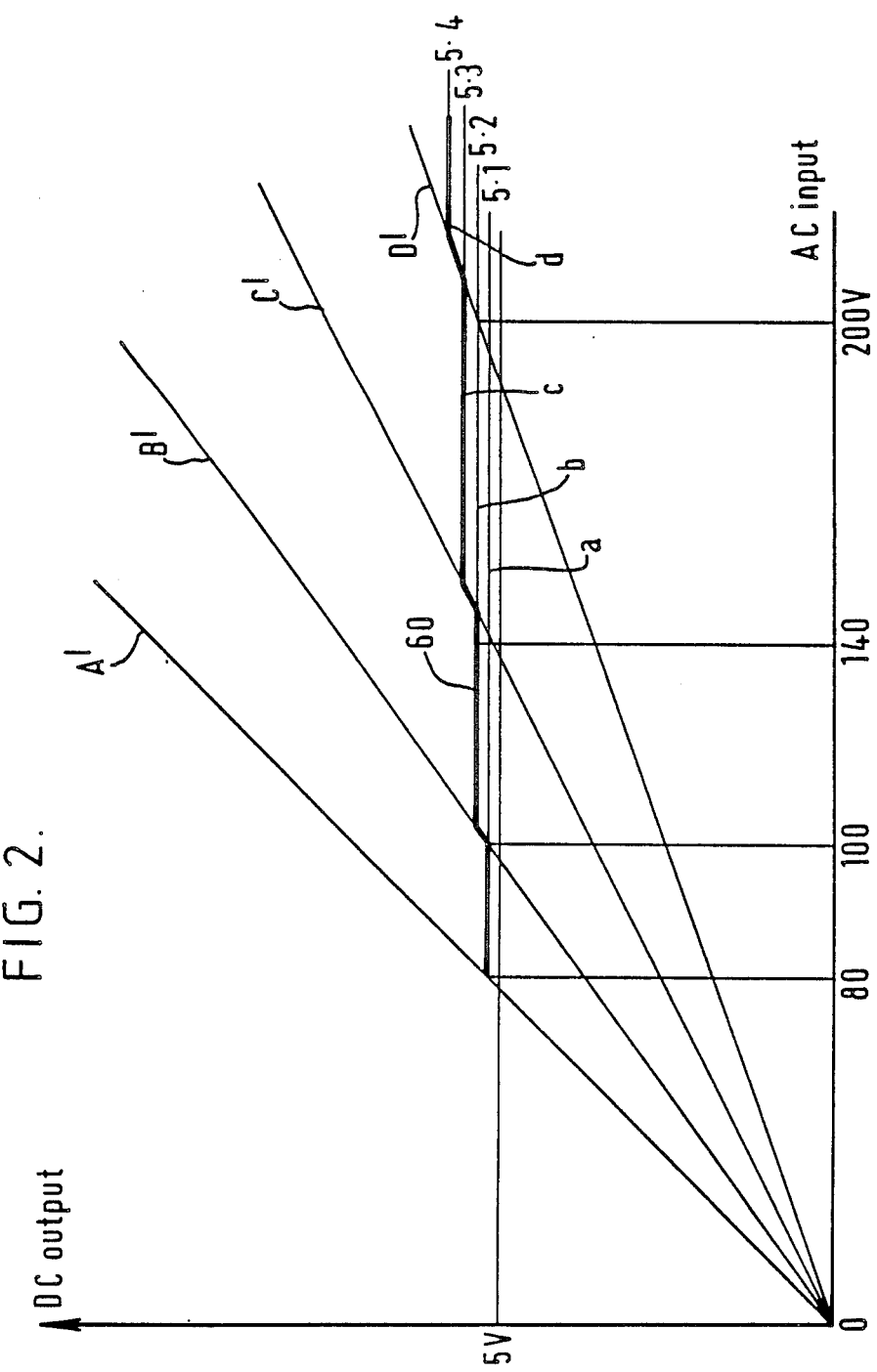
FIG. 2 is a graph illustrating the operation of a power source according to the invention.

Reference will now be made to FIG. 2 to illustrate the operation of the power source 10. The voltage above ground at the points 22 to 28 relative to the input voltage V is designated by the lines A' to D', respectively.

In turn the maximum predetermined voltage level passed by the transistors 50 in the lines A to D at their collectors is given by the lines a to d, respectively, whilst the voltage v at the output is given by the thick line 60.

In the example shown the maximum voltage levels a to d are say, 5.1, 5.2, 5.3 and 5.4 volts, so that the maximum variation in output voltage v is from 5.1 to 5.4 volts depending upon the value of the input voltage V in the range 80 to 260 volts.

The lines A' to D' show the voltages resulting at the points 22 to 28 as the input AC voltage varies. Thus, at an instantaneous input voltage of 80 of 100 volts AC, the line A' will have reached a figure of 5.1 volts DC which will then be fixed at that substantially constant value by the voltage regulator 32 in the line A. If on the other hand the input voltage is in the range of about 100 to 140 volts then now it will be seen that the line B' will have reached the figure of 5.2 volts at which it will in turn be fixed by the regulator 32 in the line B. Then any DC current drawn from the voltage v at the output 38 will come from the line B, whilst the diode 34 in the line A prevents any back current flow through that line.

In similar fashion between about 140 and 210 volts input, the line C reaches a steady maximum voltage of 5.3 volts and output current at point 38 will be drawn from line C, and above about 210 volts input the line D reaches the steady maximum voltage of 5.4 volts and the output current is drawn from the line D.

In many cases this variation in v from 5.1 to 5.4 volts depending upon the voltage V is sufficiently constant for the piece of equipment with which the power source is associated. However, if a more constant supply is required, then a further voltage regulating step may be required. This is achieved by passing the output from the point 34 to another voltage regulator 64, which can be identical with the regulators 32. However, the set voltage for this regulator must be lower than that for the lowest of the lines A to D, namely line A. In the example shown in FIG. 2, if the set maximum voltage of the regulator 64 is 5.0 volts, then the small variation from 5.1 to 5.4 can be avoided and the resulting final DC outputs voltage u at an output 66 will be substantially constant at 5.0 volts.

Figure 1B:
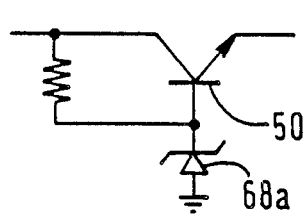
FIG. 1B is a detail showing another modified embodiment.
Figure 1C:
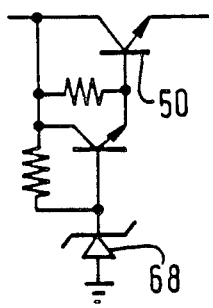
FIG. 1C is a detail showing a further modified embodiment.

The precise construction for the voltage regulators 32 and 64 is not critical. For example as shown in FIG. 1B each regulator may have its own zenner diode 68a having the appropriate threshold voltage or as shown in FIG. 1C each regulator may include a Darlington pair arrangement.

Although the diodes 34 are shown, they will often not be necessary since the transistors 50 will act as diodes to prevent return current flows along the lines A to D.

What we claim is:

1. An electrical power source capable of accepting an input within a range of AC input voltages and providing a substantially constant DC output supply, comprising converter means for providing from the AC input supply a number of outputs of differing voltages each proportional to the input voltage, each of these outputs being connected respectively to one of a number of parallel circuit lines each of which includes a rectifier, a maximum voltage regulator and non-return current device, the outputs of these lines being connected to a common output intended to provide the substantially constant DC voltage supply, each voltage regulator having a set regulating voltage which is one of a discrete range of voltage steps close to the required substantially constant DC voltage, the lowest of the steps being no greater than the voltage reached for the line connected to the highest output from the converter means when the input supply is at the low end of the range of AC voltages, the next of the steps being greater than the lowest and being reached for the line connected to the next highest output from the converter means, and, if there are more than two parallel circuit lines, the next step being greater and being reached for the line connected to the next highest output from the converter means and so on, so as to cover the whole range of possible input AC voltages.

2. An electrical power source as claimed in claim 1 in which the converter means comprises a transformer with a number of output taps corresponding to the number of parallel circuit lines.

3. An electrical power source as claimed in claim 1 in which there are four parallel circuit lines to cover a range of input voltages of from 80 to 260 volts.

4. An electrical power source as claimed in claim 1 in which a Zener diode acts as the maximum voltage regulator.

5. An electrical power source as claimed in claim 1 in which the DC voltage from common output of the parallel circuit lines is fed through another maximum voltage regulator having a set output voltage which is lower than the lowest of the set values of the parallel circuit lines.

* * * * *